United States Patent
Gupta et al.

(10) Patent No.: US 11,720,500 B2
(45) Date of Patent: Aug. 8, 2023

(54) PROVIDING AVAILABILITY STATUS ON TRACKS FOR A HOST TO ACCESS FROM A STORAGE CONTROLLER CACHE

(71) Applicant: INTERNATIONAL BUSINESS MACHINES CORPORATION, Armonk, NY (US)

(72) Inventors: Lokesh Mohan Gupta, Tucson, AZ (US); Beth Ann Peterson, Tucson, AZ (US); Matthew G. Borlick, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/466,558

(22) Filed: Sep. 3, 2021

(65) Prior Publication Data
US 2023/0073544 A1    Mar. 9, 2023

(51) Int. Cl.
*G06F 12/00*    (2006.01)
*G06F 12/0895*    (2016.01)
*G06F 13/42*    (2006.01)
*G06F 13/16*    (2006.01)

(52) U.S. Cl.
CPC ...... *G06F 12/0895* (2013.01); *G06F 13/1668* (2013.01); *G06F 13/4282* (2013.01); *G06F 2213/0026* (2013.01)

(58) Field of Classification Search
CPC ...... G06F 12/00; G06F 12/0895; G06F 13/00; G06F 13/1668; G06F 13/4282
See application file for complete search history.

(56) References Cited

U.S. PATENT DOCUMENTS

| | | | |
|---|---|---|---|
| 5,579,503 A | 11/1996 | Osborne | |
| 6,148,359 A * | 11/2000 | Elkhoury | G06F 13/4027 711/146 |
| 6,272,604 B1 * | 8/2001 | Nunez | G06F 12/0831 711/146 |
| 6,275,897 B1 * | 8/2001 | Bachmat | G06F 12/0866 711/E12.019 |

(Continued)

FOREIGN PATENT DOCUMENTS

| | | |
|---|---|---|
| CN | 109558337 A | 4/2019 |
| CN | 111837102 A | 10/2020 |
| CN | 111881068 A | 11/2020 |

OTHER PUBLICATIONS

H. Kim, et al., "Flash-Conscious Cache Population for Enterprise Database Workloads," IBM Corporation, ADMS, Sep. 2014, 12 pages.

(Continued)

*Primary Examiner* — Tuan V Thai
(74) *Attorney, Agent, or Firm* — Konrad Raynes Davda & Victor LLP; David W. Victor

(57) ABSTRACT

Provided are a computer program product, system, and method for determining status of tracks in storage cached in a cache for a host. A storage controller receives from the host a list of tracks for the host to access and determines whether the tracks in the list are available in the cache for immediate access. A response is returned to the host indicating the tracks as one of available in the cache for immediate access and not available in the cache for immediate access.

17 Claims, 6 Drawing Sheets

(56) References Cited

U.S. PATENT DOCUMENTS

| | | | |
|---|---|---|---|
| 6,393,523 B1* | 5/2002 | Peng | G06F 9/3812 |
| | | | 711/123 |
| 6,438,661 B1* | 8/2002 | Beardsley | G06F 11/1435 |
| | | | 711/144 |
| 6,457,101 B1* | 9/2002 | Bauman | G06F 12/0817 |
| | | | 711/143 |
| 10,691,566 B2 | 6/2020 | Anderson et al. | |
| 10,712,953 B2 | 7/2020 | Crawford et al. | |
| 11,023,383 B2 | 6/2021 | Anderson et al. | |
| 11,151,037 B2 | 10/2021 | Gupta et al. | |
| 2006/0080510 A1* | 4/2006 | Benhase | G06F 12/123 |
| | | | 711/E12.072 |
| 2008/0320262 A1 | 12/2008 | McKenney et al. | |
| 2010/0257321 A1 | 10/2010 | Gupta | |
| 2015/0127908 A1 | 5/2015 | Ghai et al. | |
| 2016/0127493 A1 | 5/2016 | Shalom et al. | |
| 2017/0124000 A1 | 5/2017 | Ash et al. | |
| 2017/0124001 A1 | 5/2017 | Ash et al. | |
| 2019/0034303 A1 | 1/2019 | Anderson et al. | |
| 2021/0042241 A1* | 2/2021 | Gupta | G06F 12/123 |
| 2021/0049109 A1 | 2/2021 | Gupta et al. | |
| 2021/0216459 A1* | 7/2021 | Benhanokh | G06F 13/1663 |
| 2022/0121395 A1* | 4/2022 | Brewer | G06F 3/0659 |

OTHER PUBLICATIONS

U.S. Appl. No. 17/466,535, filed Sep. 3, 2021.
List of Patents or Patent Applications Treated as Related, dated Sep. 3, 2021, p. 2.
U.S. Appl. No. 17/389,315, filed Jul. 29, 2021.
PCT Search Report and Written Opinion dated Aug. 26, 2022, 8pp , for Application No. PCT/CN2022/103651.
Notice of Allowance dated Sep. 9, 2022, 12 pp., for U.S. Appl. No. 17/466,535.
PCT Search Report and Written Opinion dated Sep. 29, 2022, 9pp., for Application No. PCTCN2022/106480.
Notice of Allwoance dated Jul. 19, 2022, pp. 13, for U.S. Appl. No. 17/466,535.
Notice of Allowance dated Feb. 10, 2023, 12 pp., for U.S. Appl. No. 17/466,535.

* cited by examiner

PROVIDING AVAILABILITY STATUS ON TRACKS FOR A HOST TO ACCESS FROM A STORAGE CONTROLLER CACHE

BACKGROUND OF THE INVENTION

1. Field of the Invention

The present invention relates to a computer program product, system, and method for providing availability status on tracks for a host to access from a storage controller.

2. Description of the Related Art

In a storage environment, a host system may communicate a read/write request to a connected storage system over a fast access channel, such as a bus interface, e.g., a such as the Peripheral Component Interconnect Express (PCIe) interface. If the data is in a cache of the storage system, i.e., a read hit, then the data may be returned quickly to the host system over the faster access channel where the host thread for the read/write request is in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform a context switch from the task handling the read/write request to another task while waiting for the read/write request to complete.

There is a need in the art for improved techniques for managing host requests on a fast access channel.

SUMMARY

Provided are a computer program product, system, and method for determining status of tracks in storage cached in a cache for a host. A storage controller receives from the host a list of tracks for the host to access and determines whether the tracks in the list are available in the cache for immediate access. A response is returned to the host indicating the tracks as one of available in the cache for immediate access and not available in the cache for immediate access.

Provided are a computer program product, system, and method for a host to communicate with a storage controller to determine a status of tracks in a cache within the storage controller or a storage. The host sends a list of tracks to access to the storage controller. The host receives, from the storage controller, a response indicating the tracks in the list as one of available in the cache for immediate access and not available in the cache for immediate access. The host sends a first Input/Output (I/O) request to the storage controller on a first channel to access a first track indicated in the response as available in the cache for immediate access. The host sends a second I/O request to the storage controller on a second channel to access a second track indicated in the response as not available in the cache for immediate access, wherein the first channel has lower latency than the second channel.

DETAILED DESCRIPTION

In current storage environments using a fast access channel, such as the PCIe bus interface, for I/O requests that must complete within a threshold time, the storage system may fail the request if the target track is not already in cache. However, even if the track is in cache, significant latency may be experienced if the target track is being accessed by another process and a lock must be obtained in order to access the target track in the cache to process the host I/O request on the fast channel. This latency to access a track currently being accessed by other processors may result in unacceptable latency beyond the threshold time to complete processing a host request on the fast channel.

Described embodiments provide improvements to computer technology for host access requests submitted on a fast access channel by providing track status information to the host before the host submits I/O requests to the tracks on the fast access channel. The track status information as to whether the track has an active status, i.e., is currently accessed by other processes, or an inactive status, not currently accessed, may be determined from an active track data structure or an active bit in the cache control block for a requested track. If the target track has an active status, then the host may submit the request on the slow access channel to avoid latency waiting to obtain a lock on the track in the cache while another process is accessing the target track. If the target track in the cache has an inactive status, then the host may submit the I/O request on the fast access channel because the target track may be immediately accessed in the cache to complete the processing of the host request.

In further embodiments, the host may additionally request, before submitting I/O requests on the fast access channel, that the storage controller make the tracks available in the cache for immediate access. The storage controller may process such a request to make tracks available before the host submits the I/O requests by staging future target tracks into cache that are not currently in cache. To make tracks already in cache available, the storage controller may submit special track access request to access and obtain a lock to the tracks to hold for the host I/O requests on the fast access channel so the I/O request, e.g., read or write, on the fast access channel can immediately access the tracks in cache and complete within the threshold time required for the fast access channel.

Figure 1:
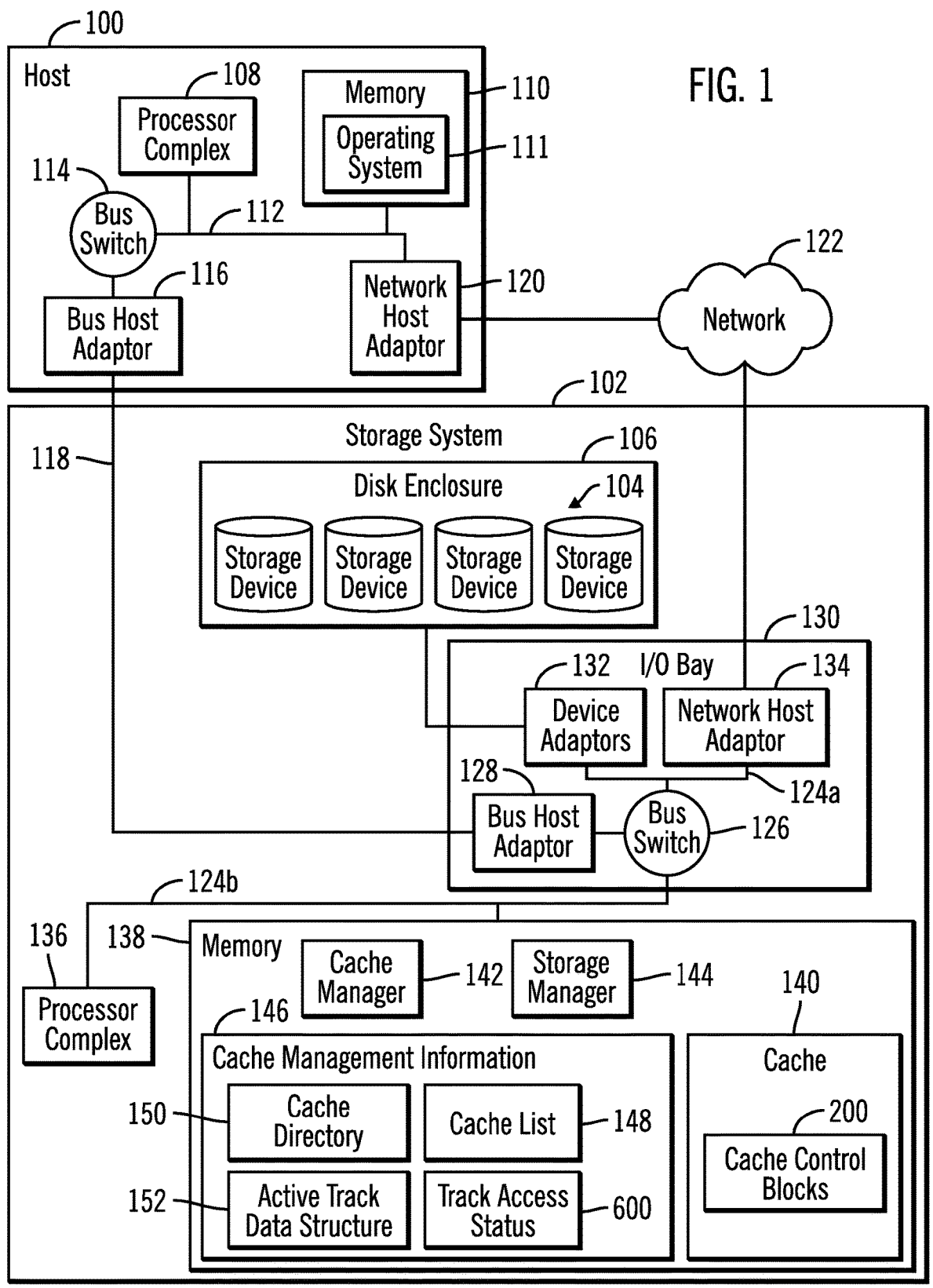
FIG. 1 illustrates an embodiment of a storage environment.

FIG. 1 illustrates an embodiment of a storage environment in which a host 100 directs read and write requests to a storage system 102 to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A first channel, also referred to as a fast channel or fast access channel, is a bus interface, such as a Peripheral Component Interconnect Express (PCIe), including a bus 112, a bus switch 114 to connect one or more devices on the bus 112, including the processor complex 108, a memory system 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology. A second channel, also referred to as slower channel, to connect the host 100 and storage system 102 uses a network host adaptor 120, connected to the bus 112, that connects to a separate network 122 over which the host 100 and storage system 102 additionally communicate. The first channel through the bus interface 118 may comprise a faster access channel than the network 122 interface through the network host adaptor 120.

The storage system 102 includes a bus interface comprising a bus 124a, 124b, a bus switch 126 to connect to endpoint devices on the bus 124a, 124b, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a cache manager 142 and a storage manager 144. The storage manager 144 manages access requests from processes in the hosts 100 and storage system 102 for tracks in the storage 104. The devices 136, 138, 128, 132, and 134 connect over the bus interface implemented in the bus lanes 124a, 124b and bus switch 126.

The cache manager 142 maintains accessed tracks in the cache 140 for future read access to the tracks to allow the accessed tracks to be returned from the faster access cache 140 instead of having to retrieve from the storage 104. Further, tracks in the cache 140 may be updated by writes. A track may comprise any unit of data configured in the storage 104, such as a track, Logical Block Address (LBA), storage cell, group of cells (e.g., column, row or array of cells), sector, segment, etc., which may be part of a larger grouping of tracks, such as a volume, logical device, etc.

In certain implementations, such as with the International Business Machines Corporation ("IBM") Z/OS® operating system, each segment may have an associated descriptor referred to as a cache segment control block (CSCB), where one of the CSCBs is cast as a cache control block, referred to as cache directory control block (CDCB). The cache 140 may be divided into 4K segments. Each track in cache can have up to seventeen CSCBs. One of the CSCBs in the track is designated as the cache control block, also referred to as a CDCB (Cache Directory Control Block) and holds all the track related control information. There is one cache control block for each track in the cache 140 providing metadata on the track in the cache 140. (Z/OS is a registered trademark of IBM throughout the world).

The cache manager 142 maintains cache management information 146 in the memory 138 to manage read (unmodified) and write (modified) tracks in the cache 140. The cache management information 146 may include a least recently used (LRU) cache list 148 in which to indicate tracks in the cache 140 to determine which track to demote from the cache 140; a cache directory 150 providing an index of cache control blocks 200 or segment descriptors to locations of segments in cache 140 having the cache control block 200 or segment identified in the cache directory 126; an active track data structure 152 indicating active tracks in the cache 140; and track access status 600 indicating status of tracks for which access is requested to make available for immediate access in the cache 140 for expected host 100 I/O requests.

In one embodiment, the active track data structure 152 may comprise a bitmap having a bit for each segment in the cache 140. A track may be allocated multiple segments in the cache 140, and the cache control block $200_i$ for a track, having metadata for the track, may reside in one of the segments allocated to the track. The bit in the bitmap 152 corresponding to the cache control block $200_i$ for the track may be set to indicate the track is active or inactive. The bits in the active track data structure 152 bitmap representing segments having track data and not the cache control block $200_i$ are left unused. Portions or bits of the active track data structure 152 bitmap may be implemented in cache lines that need to be locked to process the bits to determine whether corresponding cache control blocks $200_i$ are active.

In certain embodiments, the cache directory 150 may be implemented as a scatter index table, where a track address or cache control block identifier is hashed to an entry in the table. If the cache 140 has data for that cache control block or track, the entry in the cache directory 150 to which the value hashes would have a pointer to a location in cache 140 where the cache control block $200_i$ segment for a track is stored.

The cache manager 142 and storage manager 144 are shown in FIG. 1 as program code loaded into the memory 138 and executed by the processor complex 136. Alternatively, some or all of the functions may be implemented as microcode or firmware in hardware devices in the storage system 102, such as in Application Specific Integrated Circuits (ASICs).

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124a, 124b, 126, and 128 may comprise a Peripheral Component Interconnect Express (PCIe) bus interface technology. In alternative embodiments, the bus interfaces 112, 114, 116, 118, 124a, 124b, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), the Internet, an Intranet, etc., and the network host adaptors 120, 134 provide the network 122 connections between the hosts 100 and storage system 102.

The storage system 102 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

Figure 2:
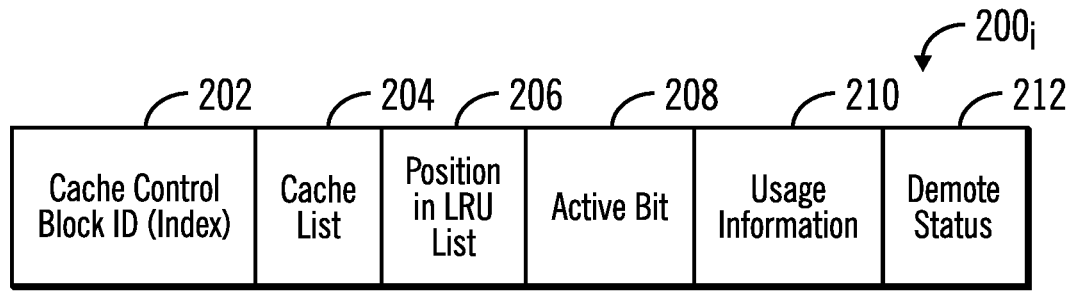
FIG. 2 illustrates an embodiment of a cache control block.

FIG. 2 illustrates an embodiment of an instance of a cache control block 200$_i$ for one of the tracks in the cache 140, including, but not limited to, a cache control block identifier 202, such as an index value of the cache control block 200$k$; the cache list 204 in which the track associated cache control block 200$_i$ is indicated; a position in the LRU cache list 206 where the track is indicated; an active bit 208 indicating whether the track is indicated as having active status or inactive status in the active track data structure 152; usage information 210 providing usage statistics on the track in the cache, such as active user count, active write count, lock counts, modified count, waiters, etc.; and a demote status 212 indicating whether the track identified by the cache control block 200$_i$ is to be demoted from the cache 140. Additional information may be included in the cache control block 200$_i$ not mentioned herein that is used to manage the track in the cache 140.

The active bit 208 provides an optimization to indicate whether the active track data structure 152 indicates the track is active. This allows a process to determine that the track is active without having to obtain a lock on the cache line to read the bit in the active track data structure 152 for the cache control block 200$k$. This allows processes during normal operations to determine whether the bit in the active track data structure 152 needs to be reset without having to lock the cache line having the bit to read to determine if that bit indicates active or inactive.

In certain embodiments, the active bit 208 in the cache control block 200$_i$ and the active track data structure 152 are updated to be consistent and with current information on the status of the track. Further, the usage information 210 for a track may be processed to determine whether the track is in fact active or inactive and the active track data structure 152 and active bit for the track are updated to reflect the current status. For instance, upon releasing access to a track, a determination may be made as to whether the active bit in the active track data structure 152 for the released track needs to be updated to indicate inactive by checking an active bit 208 in the cache control block to determine whether the active track data structure 152 does in fact need to be updated to indicate inactive. This optimization avoids the need to lock and access a bit in the active track data structure 128 by checking if the active bit 208 indicates the bit in the active data structure 152 needs to be reset. Further, if the active bit 208 indicates the released track is inactive, then the cache manager 142 confirms that other usage information 210 indicate that the target track is still active even though the active track data structure 152/active bit 208 indicates the track is not active. If the released target track is determined to be active even though active bit 208 and the active track data structure 152 indicates the track is inactive, then the active status information 208, 152 needs to be reset to indicate active for the target track to reflect the current status of the track based on the usage information 210. This updates the active track data structure 152 and active bit 208 with current information on an active status for a target track to optimize subsequent host I/O requests on the fast access bus interface 118.

Figure 3:
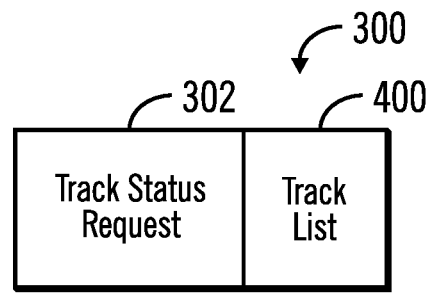
FIG. 3 illustrates an embodiment of a track status request.

FIG. 3 illustrates an embodiment of a track status request 300 the host 100 operating system 111 sends to the storage controller 102, over the fast access 118 or 122 slower access channel, to obtain information on whether tracks for which I/O requests are expected are available in the cache 140, such as whether tracks have active status (not available), inactive status (available), or are in process of being made available in cache. The track status request 300 includes a track status request operation code 302 identifying the request and a track list 400 of tracks for which status is requested.

Figure 4:
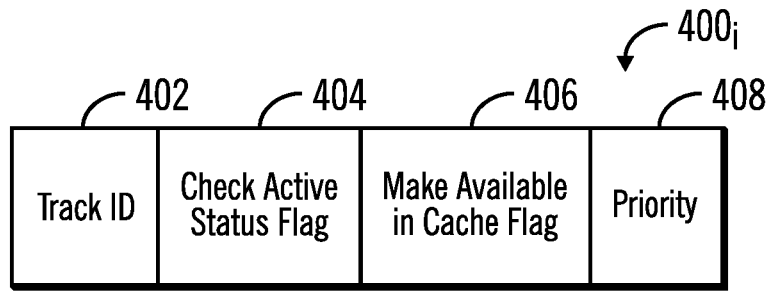
FIG. 4 illustrates an embodiment of a track list entry in a track status request.

FIG. 4 shows an embodiment of a track list entry 400$_i$ in the track list 400 including a track identifier (ID) 402; a check active status flag 404 that is set for lower priority access requests to determine whether the track has an active status (unavailable) or inactive status (available); a make available in cache flag 406 set for higher priority access requests instructing the storage controller 102 to make the track available in cache 140 by staging into the cache 140 or by requesting access, e.g., a lock, on the track so the track is held for the expected host I/O request; and a priority 408 for a track to make available in cache to instruct the storage controller 102 how long to hold access to the track while waiting for an expected host I/O request to the track.

Figures 5, 6:
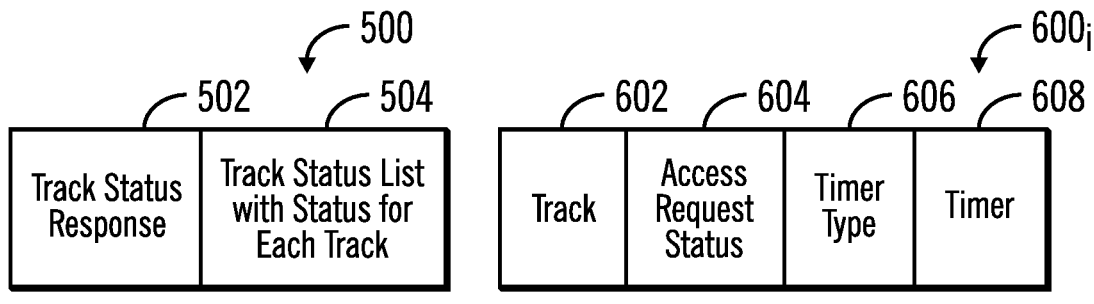
FIG. 5 illustrates an embodiment of a track status response to a track status request.
FIG. 6 illustrates an embodiment of track access status.

FIG. 5 illustrates an embodiment of a track status response 500 the storage controller 102 returns to the host 100 in response to the track status request 300 and includes: a track status response 502 operation code and a track status list 204 with the indicated status for each track in the initial list 304 sent in the track status request 300, indicating active, inactive or in process of being made available in cache 140.

FIG. 6 illustrates an embodiment of a track access status entry $600_i$ created by the storage controller 102 for a track the track status request 300 indicated to make available in the cache 140 via the make available in cache flag 406, and includes a track ID 602; an access request status 604, such as waiting for grant of access, e.g., lock, to the track 602 or lock granted; a timer type 606 to use based on a priority 408 of the track 402, such as a longer timer for tracks expecting high priority requests and a shorter timer for tracks expecting lower priority 408 requests; and a timer 608, comprising an instance of the timer type 606, which is started when access to the track is granted. If the timer 608 expires before receiving a host I/O request to the track, then access to the track is released to allow other processes to access.

With the embodiment of FIG. 6, the storage controller 102 maintains access, e.g., holds the lock, to the track 602 for a longer period if a high priority I/O request is expected to the track 602 and holds the lock for a shorter period if a low priority I/O request is expected to the track 602.

Figure 7:
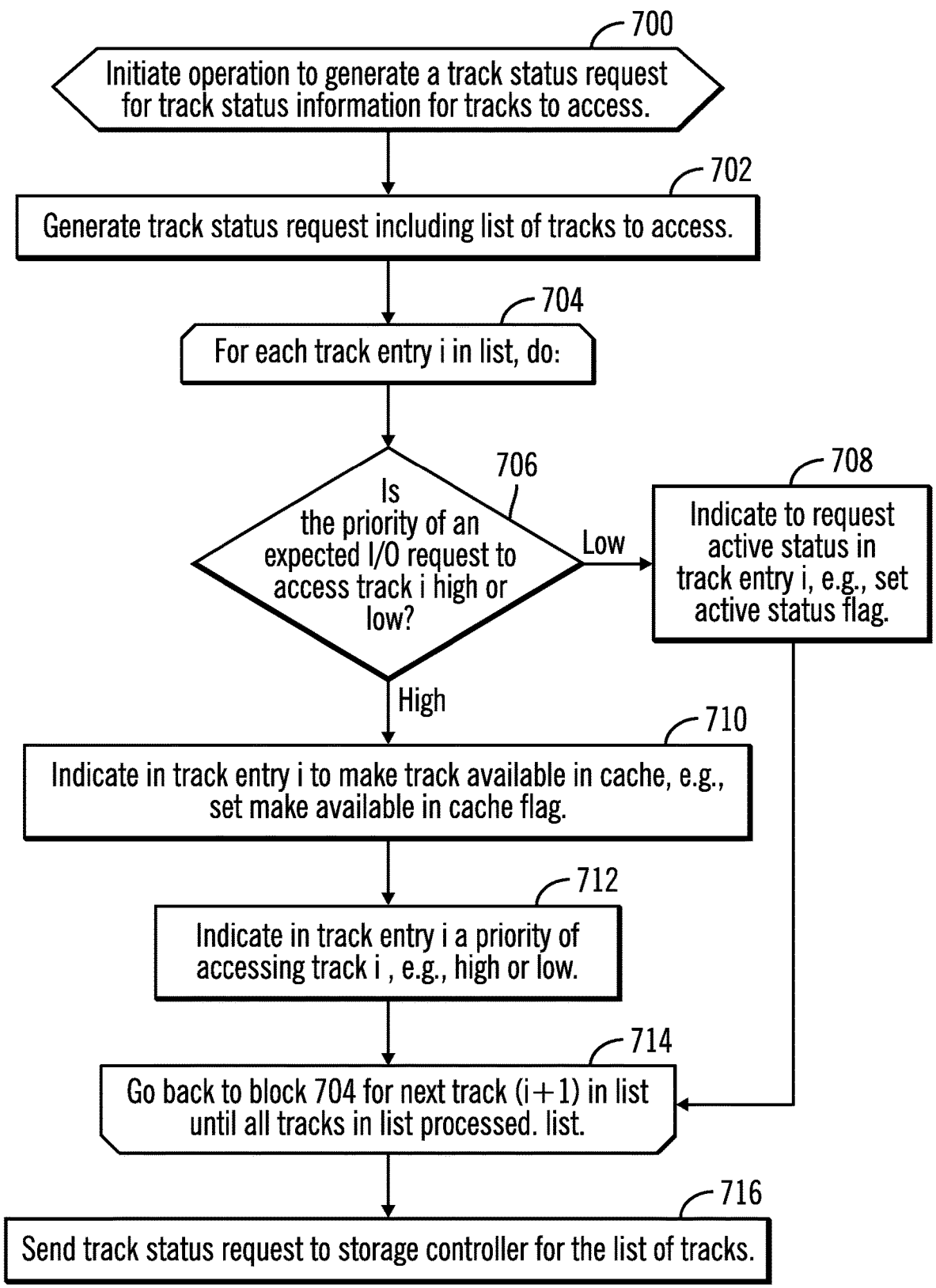
FIG. 7 illustrates an embodiment of operations to generate a track status request for track status information for tracks to access.

FIG. 7 illustrates an embodiment of operations performed by the host 100 operating system 111 to generate a track status request 300 to request status on tracks the host 100 intends to later access. Upon initiating (at block 700) an operation to generate a track status request, the operating system 111 generates (at block 702) a list of tracks 400 to access. A loop of operations is performed at blocks 704 through 714 for each track entry $400_i$ in the list 400. At block 706, if the priority of an expected I/O request to access track i is low, then the check active status flag 404 is set (at block 708) to indicate to return the track i status, as active or inactive. If (at block 706) the priority of the I/O request expected to the track i is high, then indication is made in track entry $400_i$ to make the track available in cache 140, such as setting the make available in cache flag 406. The priority 408 of accessing the track, e.g., high or low, is indicated in the track entry $400_i$ when setting the flag 406. The priority indicated in field 408 may be different than the priority used to determine whether to check for active status or to make the track available in cache. After indicating the type of status to request for each of the tracks in flags 404 or 406, the host 100 sends (at block 700) the track status request 300 to the storage controller 102 to process.

With the embodiment of FIG. 7, the host 100 may request the status of tracks that are expected to be subject to I/O requests by requesting the active or inactive status or by specifying to make a track available in the cache 140 for the fast access channel, which requires that the requested track be available in cache 140. Further, the fast access channel may be used for tracks that are inactive in the cache 140. By obtaining the status of tracks, the host 100 can determine the most effective use of channel resources for I/O requests, so only I/O requests to tracks that can be processed within an acceptable time for the fast access channel are sent on the fast access channel. Further, the host may request that certain tracks be made available in the cache 140 if not yet available so the tracks will be available for access for I/O requests sent on the fast access channel.

Figure 8:
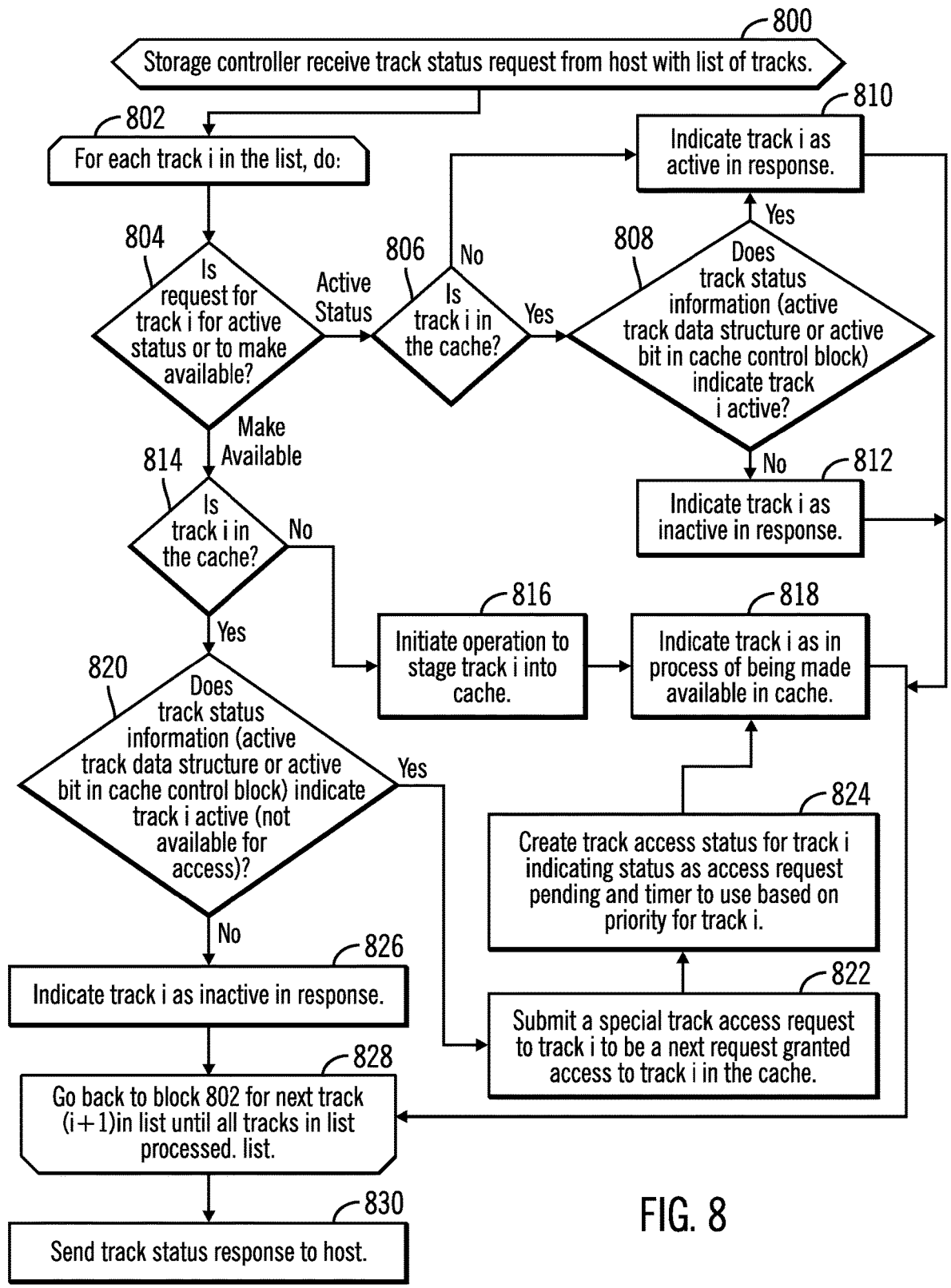
FIG. 8 illustrates an embodiment of operations to process a track status request to determine track status for tracks indicated in the track status request.

FIG. 8 illustrates an embodiment of operations performed by the cache manager 142 of the storage controller 102 to process a track status request 300 from the host 100. Upon receiving the track status request 300 from the host, a loop of operations is performed at blocks 802 through 828 for each track in the list 400. At block 804, if the request for track i is for active status, then if (at block 806) the track is in the cache 140, a determination is made (at block 808) as to whether track status information (active track data structure 152 or active bit 208 in cache control block $200_i$) indicates the track is active, i.e., other processes are currently accessing the track, such as holding a lock on the track. If (at block 808) the track i is active, then the track status for the track i in the track status list 504 to include in the track status response 500 is indicated as active. If (at block 808) the track i is inactive, then the track status for the track i in the track status list 504 to include in the track status response 500 is indicated (at block 812) as inactive. If (at block 806) the track i is not in the cache 140, then the track i is indicated (at block 810) as active, or unavailable, in the track status list 504.

If (at block 804) the request is to make the track available in the cache, i.e., flag 406 is set in the request 300 for track i, then if (at block 814) the track i is not in the cache 140, then the cache manager 142 initiates (at block 816) an operation to stage track i into the cache 140 from the storage 104 and indicates (at block 818) the status 504 of track i as in process of being made available. If (at block 814) the track i is in the cache 140, then a determination is made (at block 820) as to whether track status information indicates the track as active, i.e., not available for access. If (at block 820) the track i is active, then the cache manager 142 submits (at block 822) a special track access request to track i to be a next request granted access to track i in the cache 140. This special access request may be placed ahead of other access requests in a queue waiting for the lock to access to the track. A track access status $600_i$ is created (at block 824) for track i indicating status 604 as access request pending and a timer type 606 is indicated based on a priority 408 for track i. For high priority 408 requests, a longer timer type is indicated in field 606 than for a lower priority request 408 where a shorter timer type is indicated in field 606. In this way, the cache manager 142 holds access to the track i longer for higher priority requests than lower priority requests. If (at block 820) the track status information indicates the track i is inactive, then the status for track i in the track status list 504 is indicated (at block 826) as inactive, i.e., available for access.

After indicating the status of all tracks in the list 400 in the track status list 504 in the track status response 500, the storage controller 102 sends (at block 830) the track status response 500 to the host 100.

With the embodiment of operations of FIG. 8, the status of the track may be indicated based on track status information, such as in the active track data structure 152 or the active bit 208 of the cache control block $200_i$ of the track in the list 400. If a track is requested to be made available in cache regardless of its status as active or inactive, then it is staged into cache 140 if not in cache 140 or a an access request is issued to access the track if it has an active status, i.e., another process is currently accessing the track. The determined status of each track in the list 400 of the status request 300 is indicated as active, inactive or in process of being made available in the cache 140 in the track status response 500 to return to the host 100.

Figure 9:
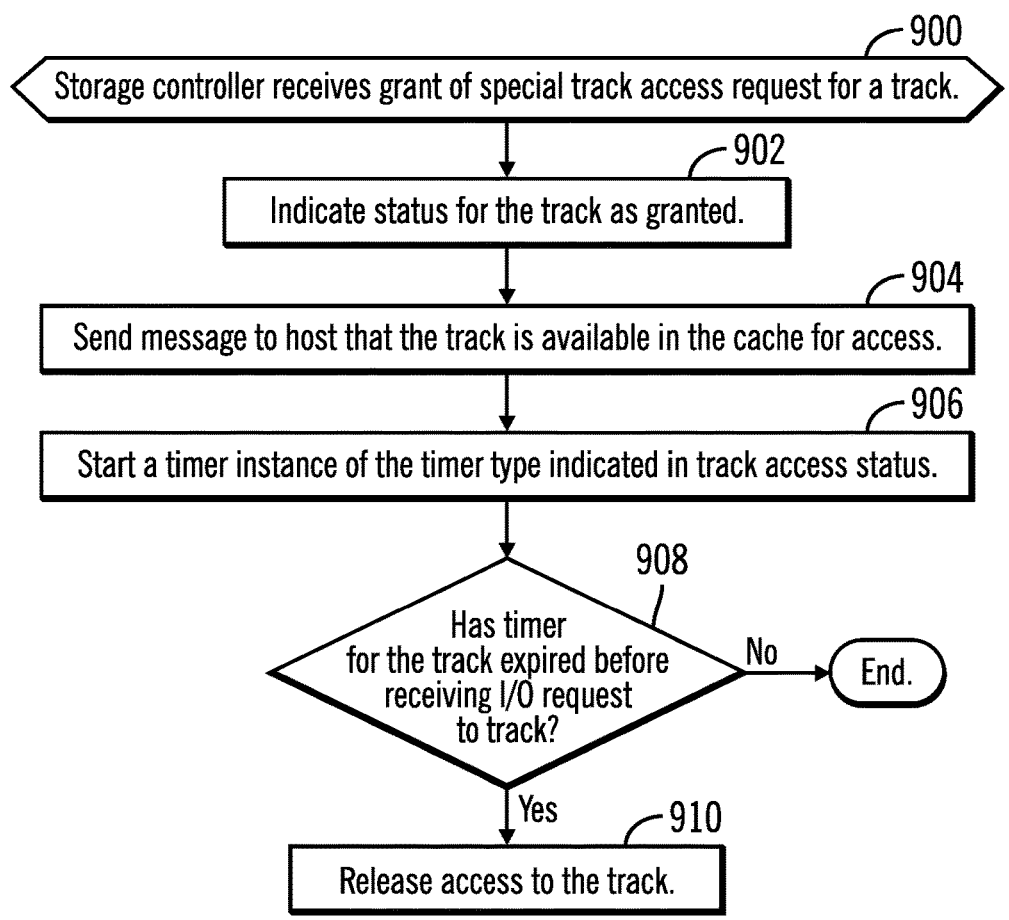
FIG. 9 illustrates an embodiment of operations to make a track available to access in cache for a host request.

FIG. 9 illustrates an embodiment of operations performed by the cache manager 142 of the storage controller 102 in response to receiving a grant to a special access request for a track. Upon receiving (at block 900) an access grant, such as a lock, to a special access request to a track, the access request status 604 in the track access status $600_i$ for the track is indicated (at block 902) as granted. A message is sent (at block 904) to the host 100 that the track is available in the cache 140 for access. A timer 608, comprising an instance of the timer type 606, is started (at block 906). If (at block 908) the timer 608 expires before receiving an I/O request to the track, then the access to the track is released (at block 910) to allow other waiting processes to access the track.

With the embodiment of FIG. 9, if a track is accessed, through the special track access request, to make available in the cache 140, then a timer 608 is set to release the track if the host 100 does not access the track before the timer expires 608 to limit the amount of time other processes are delayed from accessing the track. If an I/O request expected to a track has higher priority, then the cache manager 142 will hold the accessed track in the cache 140 for a longer period than for a low priority request. If the cache manager 142 relinquishes access to the track after the timer expires, then the host I/O request on the faster access channel 118 will fail and the host 100 will have to reissue the I/O request on the slower channel 122.

Figure 10:
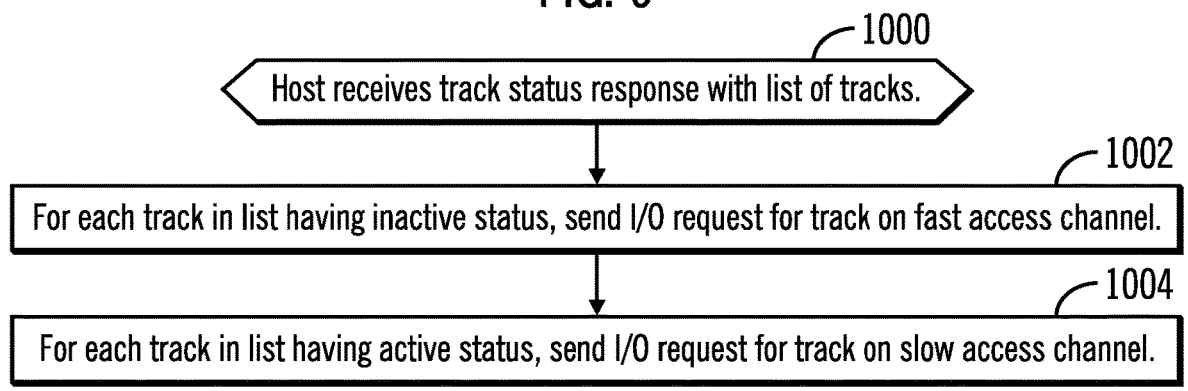
FIG. 10 illustrates an embodiment of operations performed by a host to process a track status response and generate Input/Output (I/O) requests.

FIG. 10 illustrates an embodiment of operations for the host 100 operating system 111 to process a track status response 500 from the storage controller 102. Upon receiving (at block 1000) the track status response 500, for each track in the list 504 having the inactive status, the I/O request, e.g., read or write, is sent (at block 1002) on the fast access channel 118. For each track in the list 504 having the active status, the I/O request, e.g., read or write, is sent (at block 1002) on the slower access channel 118.

Figure 11:
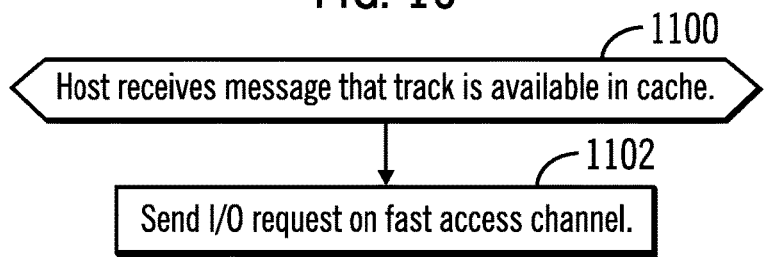
FIG. 11 illustrates an embodiment of operations performed by a host to process a message that a track is available in cache.

FIG. 11 illustrates an embodiment of operations for the host 100 operating system 111 to process a message from the storage controller 102 that a track is now available in the cache 140. Upon receiving (at block 1100) the message a track is now available in the cache 140, the I/O request, e.g., read or write, is sent (at block 1102) on the fast access channel 118.

With the embodiment of FIGS. 10 and 11, if the track status returned in the response 500 is indicated as inactive, then a host I/O request, e.g., read/write request, is sent on the fast access channel because the transaction can be processed very quickly within the time threshold for a fast access channel request because the track can be immediately accessed without having to wait for another process to relinquish a lock or access to the target track in the cache 140. However, if the track status information indicates the target track has an active status, then the host read/write request is sent on the slower access channel because the transaction will not likely complete within the time threshold required for the fast access channel. This determination is an optimization to avoid host delays in processing other tasks while the host processor is spinning on the thread handling the read/write request while waiting for the read/write request to complete. Further, by reverting to using the slower channel 120 for active tracks, the host 100 avoids having to wait on the I/O request that will likely timeout and then having to retry the request on the slower access channel 120.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
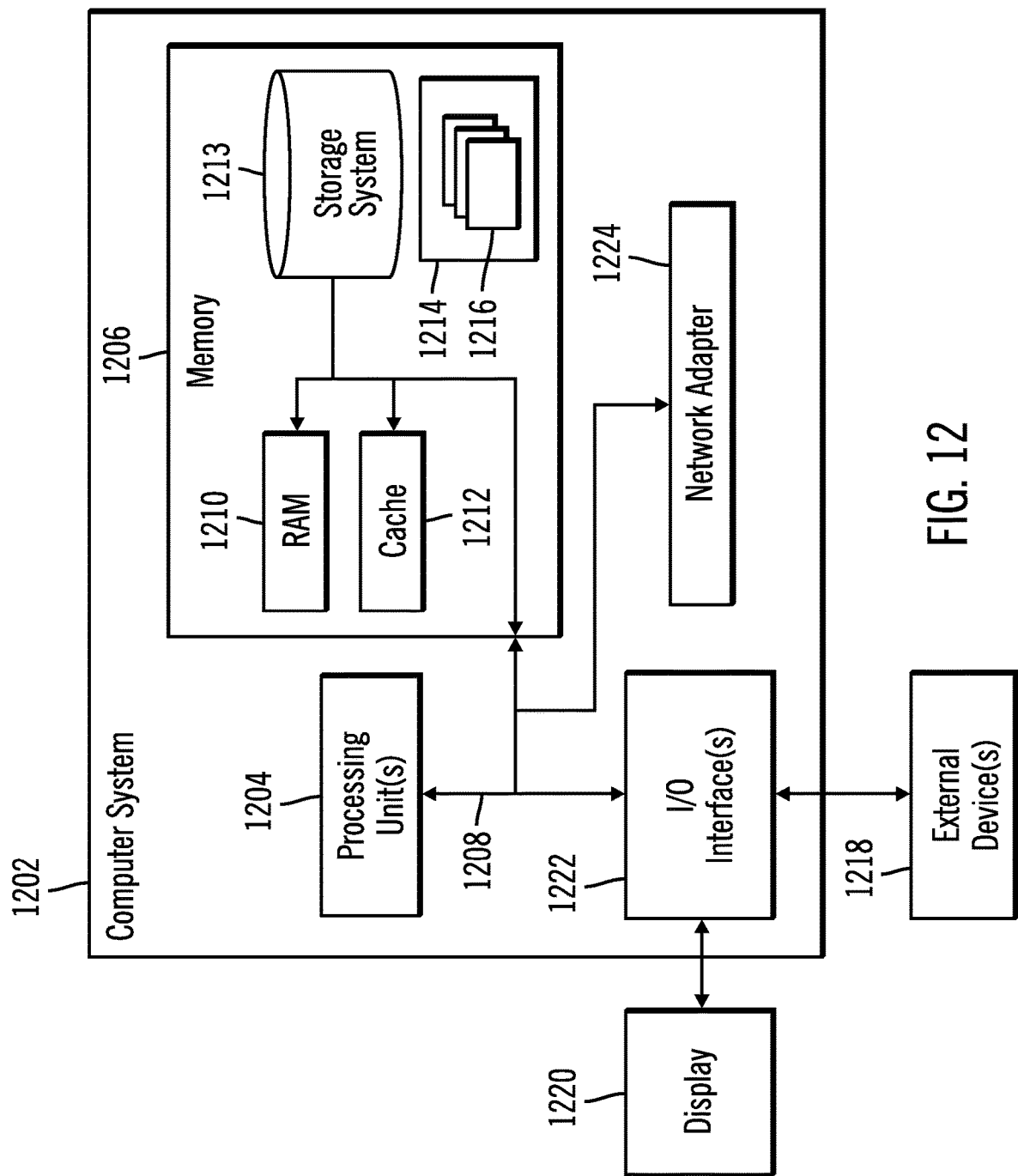
FIG. 12 illustrates an embodiment of a computer architecture used with described embodiments.

The computational components of FIG. 1, including the host 100 and storage system 102 may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus

1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for determining status of tracks in storage cached in a cache in a storage system for a host, the computer program product comprising a non-transitory computer readable storage medium having computer readable program code embodied therein that is executable to perform operations, the operations comprising:

receiving, at the storage system, from the host, a list of tracks for the host to access, wherein the list of tracks indicates a specified at least one track to make available to access in the cache;
   determining whether the tracks in the list are available in the cache for immediate access;
      determining whether the specified at least one track is available in the cache for immediate access in response to determining that the specified at least one track is in the cache;
   submitting a track access request to the specified at least one track to be a next request granted access to the specified at least one track in the cache in response to determining that the specified at least one track is being accessed by another process; and
   returning, by the storage system, a response to the host indicating at least one track of the tracks in the list as available in the cache for immediate access in response to determining the at least one track in the list as available in the cache, indicating the at least one track in the list as not available for immediate access in response to determining the at least one track in the list as not available in the cache for immediate access, and indicating that the specified at least one track is in process of being made available in the cache for access in response to submitting the track access request to the specified at least one track.

2. The computer program product of claim 1, wherein the operations further comprise:
   in response to determining that the specified at least one track is not in the cache, initiating an operation to stage the specified at least one track from the storage to the cache, wherein the response indicates that the specified at least one track is in process of being made available in the cache for access.

3. The computer program product of claim 1, wherein the operations further comprise:
   returning a message to the host indicating that the specified at least one track is available in the cache for access in response to the track access request to the specified at least one track being granted.

4. The computer program product of claim 1, wherein the operations further comprise:
   setting a timer in response to the track access request being granted to an accessed track of the specified at least one track; and
   releasing access to the accessed track in response to not receiving an I/O request from the host to the accessed track before the timer expires.

5. The computer program product of claim 1, wherein the list of tracks indicates one of a high priority and a low priority for the specified at least one track, wherein the operations further comprise:
   setting a first timer in response to track access granted for a first track of the specified at least one track having the high priority;
   setting a second timer in response to track access granted for a second track of the specified at least one track having the low priority, wherein the first timer is greater than the second timer;
   releasing the access to the first track in response to the first timer expiring before receiving a host I/O request to the first track; and
   releasing the access to the second track in response to the second timer expiring before receiving a host I/O request to the first track.

6. A computer program product for determining status of tracks in storage cached in a cache in a storage system for a host in communication with the storage system, the computer program product comprising a non-transitory computer readable storage medium having computer readable program code embodied therein that is executable to perform operations, the operations comprising:
- receiving, at the storage system, from the host, a list of tracks for the host to access;
- determining whether the tracks in the list are available in the cache for immediate access;
- determining whether the tracks in the list are in the cache;
- determining whether the tracks that are in the cache have active or inactive status from track status information, wherein the tracks in the cache have active status when at least one process currently maintains locks on the tracks that prevents access and wherein the tracks in the cache have inactive status when no process maintains a lock on the tracks that prevents other processes from accessing, wherein tracks determined not to be in the cache and tracks determined to have the active status comprise the tracks determined to not be available in the cache for immediate access, and wherein tracks determined to have the inactive status comprise the tracks determined to be available in the cache for immediate access; and
- returning, by the storage system, a response to the host indicating at least one track of the tracks in the list as available in the cache for immediate access in response to determining the at least one track in the list as available in the cache and indicating the at least one track in the list as not available for immediate access in response to determining at least one track in the list as not available in the cache for immediate access.

7. The computer program product of claim 6, wherein the track status information comprises active bits in cache control blocks for tracks to indicate active status or inactive status for the tracks in the list, wherein the determining whether the tracks in the list have the active status or the inactive status comprises determining whether the active bits in the cache control blocks indicate the active status or the inactive status or determining whether an active track data structure indicates the tracks in the list as active or inactive.

8. The computer program product of claim 6, wherein the response indicates the active status for tracks determined to have the active status and for tracks determined not to be in the cache and wherein the response indicates the inactive status for tracks determined to have the inactive status.

9. A computer program product for communicating with a storage controller to determine a status of tracks in a cache within the storage controller or a storage, the computer program product comprising a non-transitory computer readable storage medium having computer readable program code embodied therein that is executable to perform operations, the operations comprising:
- sending, to the storage controller, a list of tracks to access including indication of a specified at least one track in the list of tracks to make available to access in the cache to cause the storage controller to submit a track access request to the specified at least one track to be a next request granted access to the specified at least one track in the cache in response to determining that the specified at least one track in the cache is being accessed by another process;
- receiving, from the storage controller, a response indicating the specified at least one track of the tracks in the list as available in the cache for immediate access in response to the storage controller determining that the specified at least one track in the list as available in the cache and indicating the specified at least one track in the list as not available for immediate access in response to the storage controller determining the specified at least one least one track in the list as not available in the cache for immediate access;
- sending a first Input/Output (I/O) request to the storage controller on a first channel to access a first track indicated in the response as available in the cache for immediate access; and
- sending a second I/O request to the storage controller on a second channel to access a second track indicated in the response as not available in the cache for immediate access, wherein the first channel has lower latency than the second channel.

10. The computer program product of claim 9, wherein the operations further comprise:
- indicating a high priority or a low priority for the specified at least one track in the list, wherein the indication of the high priority causes the storage controller to hold access to the specified at least one track for a first duration and the indication of the low priority causes the storage controller to hold access to the specified at least one track for a second duration, wherein the second duration is greater than the first duration.

11. The computer program product of claim 9, wherein the operations further comprise:
- receiving a message from the storage controller indicating that the specified at least one track is available in the cache for access in response to the storage controller causing the specified at least one track to be available in the cache for access; and
- sending at least one I/O request to the specified at least one track on the first channel in response to the message.

12. A computer program product for communicating with a storage controller to determine a status of tracks in a cache within the storage controller or a storage, the computer program product comprising a non-transitory computer readable storage medium having computer readable program code embodied therein that is executable to perform operations, the operations comprising:
- sending, to the storage controller, a list of tracks to access including indication of a specified at least one track in the list of tracks to make available to access in the cache to cause the storage controller to submit a track access request to the specified at least one track to be a next request granted access to the specified at least one track in the cache in response to determining that the specified at least one track in the cache is being accessed by another process;
- receiving, from the storage controller, a response indicating the specified at least one track of the tracks in the list as available in the cache for immediate access in response to the storage controller determining that the specified at least one track in the list as available in the cache and indicating the specified at least one track in the list as not available for immediate access in response to the storage controller determining the specified at least one least one track in the list as not available in the cache for immediate access,
- sending a first Input/Output (I/O) request to the storage controller on a first channel to access a first track indicated in the response as having an inactive status; and sending a second I/O request to the storage controller on a second channel to access a second track indicated in the response as having an active status, wherein the first channel has lower latency than the second channel, and wherein the indicating in response the specified at least one track as available in the cache for immediate access further comprises indicating the inactive status, which indicates no process maintain a lock on the specified at least one track that prevents other process from accessing, and wherein the indicating in the response the specified at least one track as not available for immediate access comprises indicating the active status which indicates at least one process currently maintains a lock on the specified at least one track that prevents access.

13. The computer program product of claim 12, wherein the operations further comprise:
indicating a specified at least one track in the list to make available to access in the cache to cause the storage controller to stage the specified at least one track from the storage to the cache if the specified at least one track is not in the cache.

14. The computer program product of claim 12, wherein the operations further comprise:
sending, to the storage controller, indication to return status of whether the tracks in the list have the active status or the inactive status in response to I/O requests to the tracks in the list having a low priority; and
sending to the storage controller to make the tracks in the list available to access in the cache in response to the I/O requests to the tracks in the list having a high priority.

15. A system for determining status of tracks in storage cached in a cache in a storage system for a host, comprising:
a processor; and
a non-transitory computer readable storage medium having computer readable program code embodied therein that when executed by the processor performs operations, the operations comprising:
receiving, at the storage system, from the host, a list of tracks for the host to access, wherein the list of tracks indicates a specified at least one track of the tracks in the list to make available to access in the cache;
determining whether the tracks in the list are available in the cache for immediate access;
determining whether the specified at least one track is available in the cache for immediate access in response to determining that the specified at least one track is in the cache;
submitting a track access request to the specified at least one track to be a next request granted access to the specified at least one track in the cache in response to determining that the specified at least one track is being accessed by another process; and
returning, by the system, a response to the host indicating at least one track of the tracks in the list as available in the cache for immediate access in response to determining the at least one track in the list as available in the cache, indicating the at least one track in the list as not available for immediate access in response to determining the at least one track in the list as not available in the cache for immediate access, and indicating that the specified at least one track is in process of being made available in the cache for access in response to submitting the track access request to the specified at least one track.

16. The system of claim 15, wherein the list of tracks indicates a specified at least one track of the tracks in the list to make available to access in the cache, wherein the operations further comprise:
in response to determining that the specified at least one track is not in the cache, initiating an operation to stage the specified at least one track from the storage to the cache, wherein the response indicates that the specified at least one track is in process of being made available in the cache for access.

17. A system for determining status of tracks in storage cached in a cache for a host, comprising:
a processor; and
a computer readable storage medium having computer readable program code embodied therein that when executed by the processor performs operations, the operations comprising:
receiving, from the host, a list of tracks for the host to access;
determining whether the tracks in the list are available in the cache for immediate access;
determining whether tracks in the list are in the cache;
determining whether the tracks that are in the cache have active or inactive status from track status information, wherein the tracks in the cache have active status when at least one process currently maintains locks on the tracks that prevents access and wherein the tracks in the cache have inactive status when no process maintains a lock on the tracks that prevents other processes from accessing, wherein tracks determined not to be in the cache and tracks determined to have the active status comprise the tracks determined to not be available in the cache for immediate access, and wherein tracks determined to have the inactive status comprise the tracks determined to be available in the cache for immediate access; and
returning, by the system, a response to the host indicating at least one track of the tracks in the list as available in the cache for immediate access in response to determining the at least one track in the list as available in the cache and indicating the at least one track in the list as not available for immediate access in response to determining at least one track in the list as not available in the cache for immediate access.

* * * * *